H. L. FISHER.
POWER TRANSMISSION MECHANISM.
APPLICATION FILED MAR. 3, 1913.
1,231,344.
Patented June 26, 1917.
4 SHEETS—SHEET 3.
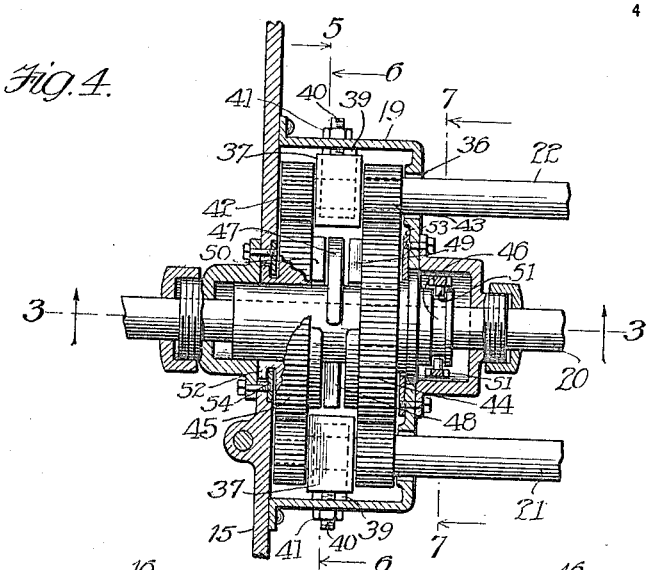
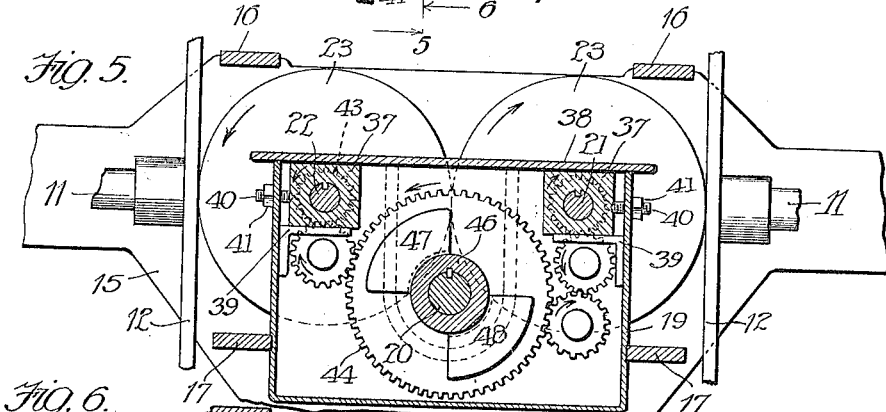
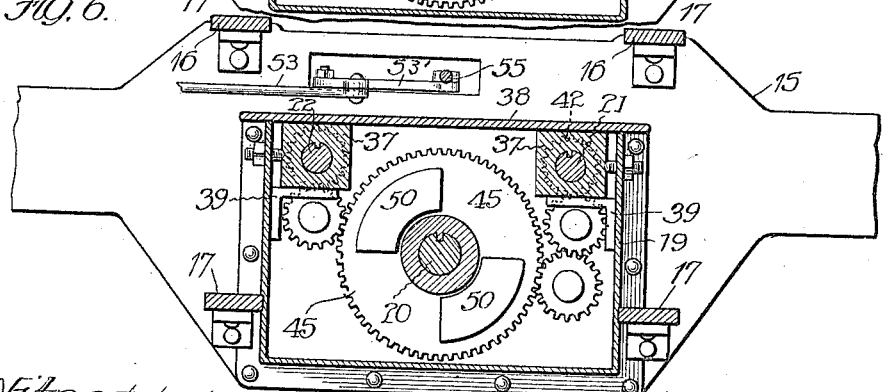

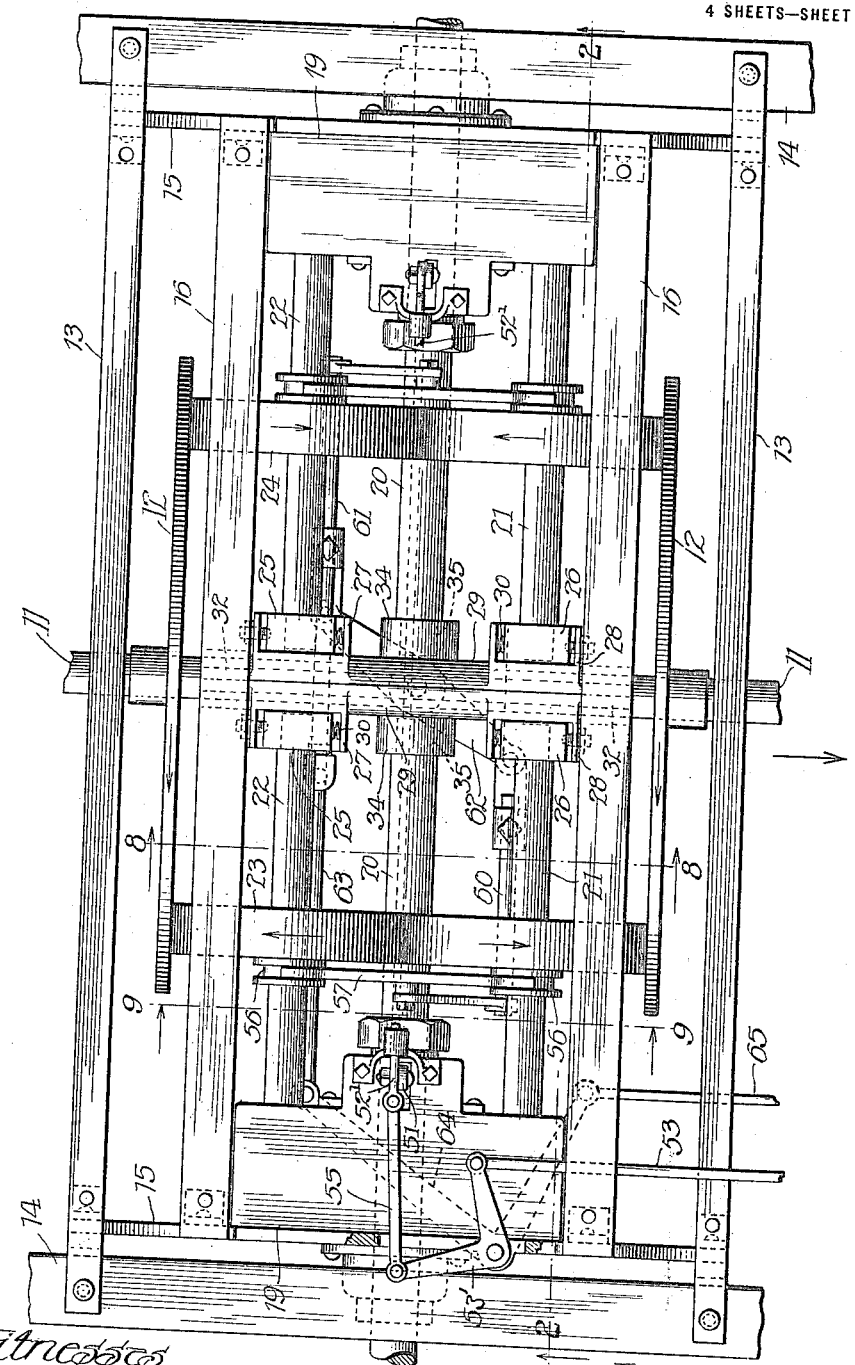

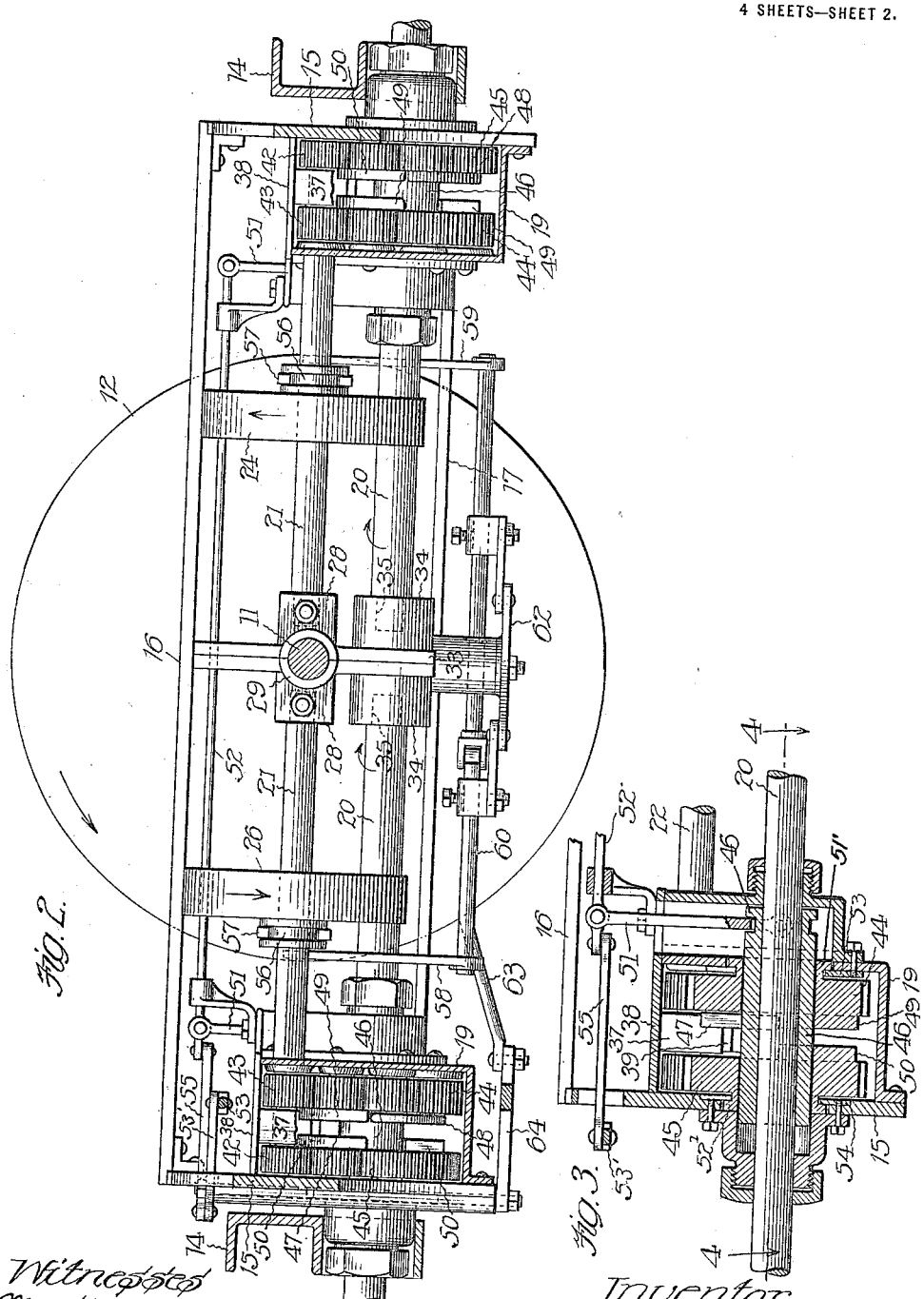

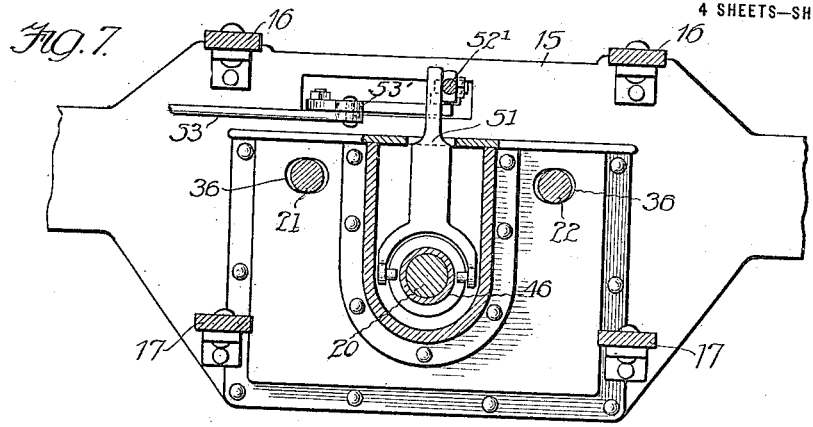
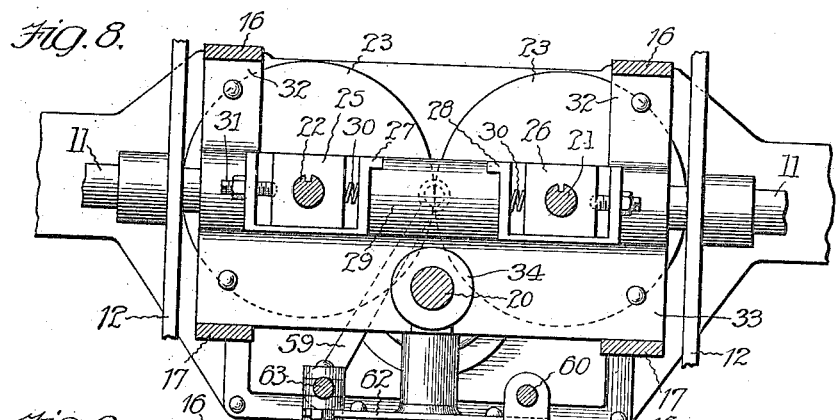
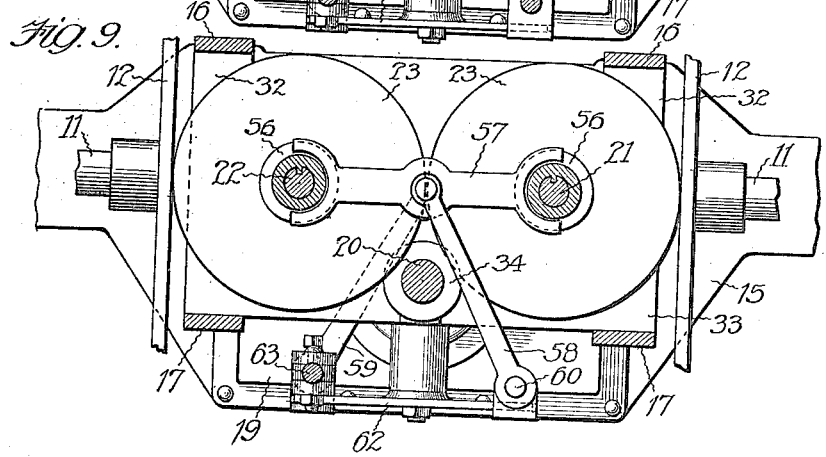

UNITED STATES PATENT OFFICE.

HARVEY L. FISHER, OF CHICAGO, ILLINOIS, ASSIGNOR TO DONALDSON AND FISHER COMPANY, OF CHICAGO, ILLINOIS.

POWER-TRANSMISSION MECHANISM.

1,231,344.

Specification of Letters Patent.

Patented June 26, 1917.

Application filed March 3, 1913. Serial No. 751,863.

*To all whom it may concern:*

Be it known that I, HARVEY L. FISHER, a citizen of the United States, residing at Chicago, county of Cook, State of Illinois, have invented certain new and useful Improvements in Power-Transmission Mechanism, of which the following is a specification.

My invention relates more particularly to transmission mechanism of the friction class which, as is well known, has the advantage of great flexibility or adjustability but the disadvantage of a somewhat reduced efficiency as compared to transmission mechanism involving positive connections as by gearing, by reason of the friction due in large measure to unbalanced pressure between the engaging elements, which pressure is necessarily thrown upon the bearings. In my improved form of transmission mechanism, however, this disadvantage is eliminated by reason of the evenly balanced pressure distribution which permits any necessary amount of pressure between the engaging parts without any substantial sacrifice of efficiency and without loss of any of the advantages of frictional transmission set out above.

My invention is in the nature of an improvement over that described in my prior application Serial No. 703,920, filed June 15, 1912. Broadly speaking, the difference between the system of the earlier application and that here described and claimed consists in the nature of the reversing means which is an essential of all such transmission mechanism. In the device of the earlier application, reversing is affected by a certain transposition of some of the friction elements by which the power is transmitted. In the present case, however, the reversing means is to an extent separate from and independent of the frictional elements by which the relative speed of the driving and driven shafts is altered.

In the accompanying drawings I have illustrated a preferred embodiment of my invention and in the following specification have given a detailed description of the same. It is to be understood, however, that the specific disclosure is for the purpose of exemplification only and that my invention is not confined thereto; and in the following claims I have endeavored to point out my invention so as to distinguish it from the prior art so far as it is known to me without, however, abandoning or dedicating any portion thereof to the public.

In referring to the drawings Figure 1 is a plan view of so much of a chassis or vehicle frame as is necessary to an understanding of my invention; Fig. 2 is a vertical longitudinal section of the same upon the plane of the line 2—2 of Fig. 1 looking in the direction of the arrows; Fig. 3 is a vertical section of a part of the apparatus in the plane of the line 3—3 of Fig. 4; Fig. 4 is a horizontal section upon the plane of the line 4—4 of Fig. 3, parts, however, being shown in elevation; Fig. 5 is a vertical, transverse section in the plane of the line 5—5 of Fig. 4 looking in the direction of the arrows adjacent said numerals; Fig. 6 is a similar section upon the same plane looking, however, in the direction of the arrows 6—6 of Fig. 4; Fig. 7 is a vertical section through the line 7—7 of Fig. 4; Fig. 8 is a vertical, longitudinal section in the plane of the line 8—8 of Fig. 1 looking in the direction thereof; and Fig. 9 is a similar section upon the line 9—9 of Fig. 1 also looking in the direction of the arrows applied to said line.

In the particular embodiment of my invention shown in the drawings and more particularly in Fig. 1 thereof, the drive shaft 11 is shown only fragmentarily but is connected up either directly or indirectly to a motor of gasolene or other type, the particular character of which is immaterial. Upon the shaft 11, suitably spaced apart and facing each other, are two friction disks 12—12 which are rigidly secured to said shaft. The latter is mounted as shown in cross bars 13—13 extending between the side bars 14—14 of the vehicle or chassis. Upon these cross bars, and parallel and adjacent to but inside of the respective side bars, are suspended end plates 15—15 which, in turn, are connected together at the top and bottom respectively and substantially braced by the upper and lower cross strips 16—16, 17—17. Connected to and supported by each of the end plates is a cast metal housing 19—19 inclosing the reversing gearing to be presently described and through which extends one of the driven cross shafts 20 which receives power from the driving shaft through the mechanism to be described and transmits it to the corresponding driving wheel of a vehicle either directly or indirectly by means which are common and well known in the art and need not be here described. At their inner ends the driven shafts are independently journaled in a manner to be presently described.

Parallel with each driven shaft, on opposite sides and somewhat above the plane thereof, extend two countershafts 21, 22 upon which are slidingly mounted or keyed friction rolls 23, 24, there being a pair of such rolls upon each side of each driving shaft, the members of which engage each other and at diametrically opposite points on their peripheries engage the opposite friction disks 12—12 whereby pressure is transmitted diametrically of the rolls from one disk to the other (see Fig. 1). There being two pairs of such friction rolls diametrically opposite each other with respect to the friction disks, and the rolls being all of the same size and character, it is clear that any pressure lengthwise of the driving shaft is balanced or borne equally upon opposite sides of the shaft, thus avoiding any bending effect.

It will be understood also that since the disks are firmly secured to the driving shaft, all the thrust of the rollers upon the friction disks is taken up by tension upon the driving shaft and is not transmitted to the bearings thereof. The friction rolls may be made of any desired friction material or their peripheries may have friction material such as leather or the like applied thereto, this matter being within the knowledge of those skilled in mechanical engineering. The shafts 21, 22 are received at their inner or adjacent ends in bearing boxes 25—25, 26—26 which are yieldingly supported in housings 27—27, 28—28, formed integral with the respective members 29—29 of a split sleeve which surrounds the driving shaft 11, as shown more particularly in Figs. 1 and 2. The housings 27 and 28, as best seen in Fig. 8, are rectangular and open at the top, the bearing blocks each being held in its box by a compression spring 30 on the one side and an adjusting screw 31 on the other. By this construction the slight adjustment which is necessary to take up wear and secure the necessary pressure between the friction rolls and the friction disks is provided though of course the particular form of bearing may be varied. The split sleeve members are formed with short upwardly extending flanges or ears 32—32 which as shown in Fig. 8 are riveted together and a continuous flange 33 is formed at the lower edge of each sleeve section, these flanges also being riveted together and formed with perforated or hollow bosses 34—34 for the reception of the reduced ends 35—35 of the driven shafts 20.

At their other or outer ends the driven and countershafts are supported in bearings in the housings 19—19 above referred to, as seen more particularly in Figs. 3, 4, 5, and 6. The countershafts 21—22 extend through slightly elongated perforations 36 in the housings and are adjustably supported in bearing blocks 37—37 which are guided horizontally between the top wall 38 of the housing and the brackets or shelves 39 formed on or secured to the housing for this purpose. The limited adjustment necessary is secured by means of adjusting screws 40 having the nuts 41—41 thereon. Within each housing each shaft 21, 22 is provided on opposite sides of its bearing block with pinions 42—43, each of which is rigidly secured to the shaft and is connected through a suitable chain of gearing with a corresponding large gear 44—45 which loosely surrounds a sleeve 46 keyed to the driven shaft section 20. Said sleeve 46 is in effect a clutch for locking at will either of the gears 44—45 to the driven shaft, being provided for this purpose with radial lugs 47—48 arranged intermediate said gear wheels and adapted to interlock with lugs 49—49 on the one gear wheel or with lugs 50, 50 on the other accordingly as the sleeve is thrown in the one direction or the other by the manually controlled means about to be described. To maintain the gears 44, 45, in proper position longitudinally of the shaft, they are provided with grooved hubs 51', 52', into the grooves of which extend the stationary fingers 53, 54. A reference to Figs. 5, 6, and 7 will show that one of the trains of gearing connecting each countershaft with the driven shaft contains an even number of gears while the other train of gearing contains an odd number of gears. It will thus be seen that each countershaft turns the driven shaft either in the same direction in which it is turning, or in the opposite direction, accordingly as the one or the other loose gear is locked to said driven shaft. Furthermore, by an inspection of the drawings it will be seen that, while the friction rolls of each pair are driven in opposite directions and the connection of the roll or countershafts to the driven shaft is such that they coöperate to drive the latter in the same direction.

The clutch sleeve 46 above referred to may be shifted to bring its lugs into engagement with either one or the other of the loose gears surrounding the same by means of an arm 51 extending downwardly from a clutch rod 52' which, as seen in Fig. 1, is common to the two clutch mechanisms upon opposite sides of the machine. The clutch rod may in turn be shifted by means of a rod 53 connected thereto by a bell crank 53' and link 55, the other end of the rod 53 extending to some convenient locality or further connected for operation by the driver of the vehicle. Thus is provided means whereby the direction of rotation of the driven shafts can be readily and simultaneously reversed. In order to vary the speed of the driven shaft with relation to that of the driving shaft, the friction rolls 23—24 which, as before stated, are keyed to the countershafts, may be shifted toward and from the centers of the friction disks, and for this purpose are each provided with a grooved hub 56—56 into the groove of which extends one arm of a double shifting fork 57 which is movable parallel to the axes of the friction roll shafts for this purpose, see Figs. 1, 2, and 9. These shifting forks are in duplicate on opposite sides of the machine, there being one of them for each pair of friction rolls, and they are connected by rods 58, 59 respectively to oppositely movable slide rods 60, 61, which are connected for relatively reverse movement to a pivoted cross head 62 (see Figs. 1 and 2). One of these rods is further connected by a link 63 with a bell crank 64 which at its other end is connected by a rod 65 to a mechanism or a handle by which it may be manipulated from the driver's seat. It will be understood that by reciprocating the rod 65, the friction rolls may, through the intermediate connections above described, be caused to approach or recede from the centers of the friction disks and thereby vary the relative speeds of the driving and driven shafts.

In the above described construction, I have produced a friction transmission mechanism which, by eliminating the torsional strain and end thrust common to most devices of this character, is unusually efficient in operation while preserving the flexibility which forms the chief advantage of transmission mechanism of this type. At the same time I have provided therein a reversing mechanism which is simple in construction and does not in any way interfere with or affect the friction drive or the means for varying the relative speeds of the driving and driven shafts.

I claim:

1. In a power transmission mechanism, a drive shaft, friction disks mounted thereon, pairs of friction rolls arranged between the disks on opposite sides of the shaft, shafts upon which the friction rolls are splined, a driven shaft adjacent each pair of friction rolls and substantially parallel to the shafts upon which said rolls are mounted and gearing connecting said roll shafts and driven shaft.

2. In a power transmission mechanism, a driving shaft, friction disks mounted thereon, pairs of friction rolls arranged between the disks on opposite sides of the shaft respectively, shafts upon which the friction rolls are splined and longitudinally movable, a driven shaft adjacent each pair of friction rolls and a reversible gearing connecting the shafts of said pair of rolls and the adjacent driven shaft.

3. In a transmission mechanism, a drive shaft, a pair of friction disks mounted thereon, a pair of driven shafts, friction rolls mounted in pairs upon opposite sides of the drive shaft and between the disks thereof roll shafts on which said rolls are mounted and a set of gearing adapted to connect each roll shaft with a driven shaft and means for throwing either one or the other of the trains of gearing into connection with its driven shaft.

4. In a transmission mechanism, a drive shaft, a pair of friction disks thereon, a pair of driven shafts located respectively on opposite sides of said drive shaft, a pair of friction rolls between said disks adjacent each said driven shaft, shafts on which said rolls are mounted and which are parallel to the adjacent driven shaft, a pair of gears loosely mounted upon each driven shaft, clutch mechanism for locking either of said gears at will to said driven shaft, gearing containing an even number of gears meshing with one of said loose gears on each driven shaft and connected to one of the adjacent friction roll shafts, gearing containing an odd number of gears meshing with the other of said gears on the driven shaft and driven by said roll shaft.

5. In a friction transmission mechanism, a drive shaft a pair of friction disks thereon, a pair of friction rolls arranged between said disks, roll shafts journaled in stationary bearings upon which said friction rolls are keyed, a driven shaft, a longitudinally movable sleeve loosely mounted upon the driven shaft, a pair of gears loosely mounted upon the sleeve, interlocking means upon the sleeve and said gears whereby said sleeve is adapted to be engaged for rotation by either of said gears, a pair of gears fixed upon each said roll shaft, gearing containing an even number of elements connecting one of said roll shaft gears to a loose gear upon said clutch sleeve and gearing containing an odd number of elements connecting the other gear upon the roll shaft with the other gear upon the clutch sleeve.

6. In a friction transmission mechanism, a drive shaft having a pair of friction disks mounted thereon, a pair of friction rolls mounted between said friction disks and adjustable toward and from the axis thereof, roll shafts mounted in stationary bearings upon which said rolls are keyed, means for adjusting said rolls longitudinally of their shafts, a pair of gears upon each roll shaft, a driven shaft, a pair of gears loosely mounted the driven shaft, means for locking either gear of said pair to said driven shaft and gearing connecting each of said loosely mounted gears on the main shaft with a gear on each of said roll shafts.

7. In a friction transmission mechanism, a drive shaft, a pair of friction disks mounted upon said shaft, a pair of driven shafts, the members of which are arranged on opposite sides of the drive shaft, pairs of friction rolls mounted upon opposite sides of the drive shaft, pairs of friction roll shafts mounted in stationary bearings on opposite sides of said drive shaft and upon which the friction rolls are longitudinally adjustable, means for adjusting said rolls, a pair of gears loosely mounted upon each driven shaft, a pair of gears fixedly mounted upon each friction roll shaft, gearing containing an even number of elements connecting each loose gear with a gear upon one of the roll shafts upon the same side of the driving shaft, gearing containing an odd number of elements and connecting each loose gear with a fixed gear on the other roll shaft upon the same side of the main shaft and means for locking the driven shaft to either of the loose gears at will.

HARVEY L. FISHER.

Witnesses:
 LOUIS B. ERWIN,
 ROBERT DOBBERMAN.

Copies of this patent may be obtained for five cents each, by addressing the "Commissioner of Patents, Washington, D. C."